United States Patent [19]

Ushida et al.

[11] 4,221,894

[45] Sep. 9, 1980

[54] PROCESS FOR POLYMERIZING α-OLEFINS CONTAINING AT LEAST 3 CARBON ATOMS AND CATALYST THEREFOR

[75] Inventors: Yoshihisa Ushida, Otake; Kiyoshi Odawara, Waki; Norio Kashiwa; Akinori Toyota, both of Iwakuni; Syuji Minami, Otake, all of Japan

[73] Assignee: Mitsui Petrochemical Industries Ltd., Tokyo, Japan

[21] Appl. No.: 951,973

[22] Filed: Oct. 16, 1978

Related U.S. Application Data

[63] Continuation of Ser. No. 748,649, Dec. 8, 1976, abandoned.

[30] Foreign Application Priority Data

Dec. 10, 1975 [JP] Japan .................................. 50/146301

[51] Int. Cl.$^2$ .......................... C08F 4/02; C08F 10/06
[52] U.S. Cl. ................................ 526/125; 252/429 B; 252/429 C; 526/351; 526/906
[58] Field of Search .................... 526/125; 252/429 B, 252/429 C

[56] References Cited

U.S. PATENT DOCUMENTS

| | | | |
|---|---|---|---|
| 4,069,169 | 1/1978 | Toyota | 526/125 |
| 4,076,924 | 2/1978 | Toyota | 526/125 |

FOREIGN PATENT DOCUMENTS

| | | | |
|---|---|---|---|
| 2355886 | 5/1974 | Fed. Rep. of Germany | 526/125 |
| 2504036 | 8/1975 | Fed. Rep. of Germany | 526/125 |
| 50-32270 | 10/1975 | Japan . | |
| 1387890 | 3/1975 | United Kingdom | 526/125 |

*Primary Examiner*—Edward J. Smith
*Attorney, Agent, or Firm*—Sherman & Shalloway

[57] ABSTRACT

A process for polymerizing or copolymerizing α-olefins having at least 3 carbon atoms or copolymerizing α-olefins having at least 3 carbon atoms with not more than 50 mole % of ethylene in the presence of a catalyst composed of an organometallic compound of a metal of Groups I to III of the periodic table and a titanium catalyst component supported on a halogen-containing magnesium compound, said titanium catalyst component being a solid reaction product obtained by treating (i) a mechanically copulverized product of a halogen-containing compound and an organic acid ester with (ii) an organo-metallic compound of a metal of Groups I to III of the periodic table, and then reacting the resulting solid product with (iii) a titanium compound in the absence of mechanical pulverization.

13 Claims, No Drawings

PROCESS FOR POLYMERIZING α-OLEFINS CONTAINING AT LEAST 3 CARBON ATOMS AND CATALYST THEREFOR

This is a continuation, of application Ser. No. 748,649, filed Dec. 8, 1976, now abandonded.

This invention relates to a process for polymerizing an α-olefin having at least 3 carbon atoms which can afford highly stereoregular polymers or copolymers of the α-olefins in high yields. Furthermore, the invention relates to a catalyst suitable for use in the above process which is easy to prepare using reduced amounts of reagents that can markedly decrease the amounts of by-products whose disposal is troublesome; and also to a process for preparing the catalyst.

A number of suggestions have heretofore been made as to an α-olefin polymerizing catalyst composed of an organometallic compound such as an organoaluminum compound and a titanium component supported on a halogencontaining magnesium compound and a process for polymerization using such a catalyst. In some of these suggestions, organic acid esters or organometallic compounds are utilized under specified set of conditions to prepare the titanium catalyst component. For example, Japanese Pat. No. 821,037 (Japanese Pat. No. 32270/75 Published Oct. 18, 1975), discloses one of such suggestions which discloses a catalyst suitable for the polymerization of ethylene or the copolymerization of ethylene with a minor amount of an olefin containing at least 3 carbon atoms. In this patent, the titanium catalyst component is prepared by treating a magnesium-containing compound with an organic acid ester, reacting the treated product with an organometallic compound, and then reacting the resulting reaction product with a titanium compound. The patent states that the reaction between the above reaction product and the titanium compound may be carried out under mechanically pulverizing conditions, but it does not at all disclose that the treatment of the halogen-containing magnesium compound with the organic acid ester is carried out under mechanically co-pulverizing conditions. Moreover, the patent is quite silent on the utilization of the resulting titanium catalyst component is the polymerization of olefins having at least 3 carbon atoms, or the copolymerization of olefins having at least 3 carbon atoms with a minor amount of ethylene.

Japanese Laid-Open Pat. No. 126590/75 discloses a catalyst suitable for the polymerization or copolymerization of olefins having at least 3 carbon atoms which uses as a titanium catalyst component a reaction product obtained by reacting a mechanically co-pulverized product of a halogen-containing magnesium compound and an organic acid ester, with a titanium compound. However, this Publication does not at all disclose that the pulverized product is pre-treated with the organometallic compound prior to the reaction of the mechanically co-pulverized product with the titanium compound, and the treated product is reacted with the titanium compound.

The preparation of catalysts in these prior suggestions is considerably complicated, and in order to obtain catalysts having good reproducibility of quality, the amounts of reagents used for catalyst preparation must be considerably large. As a result, the amounts of the reagents consumed for the formation of by-products increase. Consequently, the process is economically disadvantageous, and additional operations and devices are required for the posttreatment of the by-products that have to be discarded without causing pollution. The present inventors have made extensive investigations with a veiw to providing catalysts which can afford highly stereoregular polymers or copolymers of α-olefins having at least 3 carbon atoms in high yields, and an improved process for polymerizing α-olefins having at least 3 carbon atoms.

As a result, the inventors have found that a catalyst composition comprising (A) a titanium component supported on a halogen-containing magnesium compound which comprises a solid reaction product obtained by pre-treating a mechanically copulverized product of a halogen-containing magnesium compound and an organic acid ester with an organometallic compound of a metal of Groups I to III of the periodic table, and then reacting the treated solid product with a titanium compound in the absence of mechanical pulverization, and (B) an organometallic compound exhibit superior catalytic activity in the polymerization of α-olefins having at least 3 carbon atoms. It has also been found that as a result of using this catalyst, highly stereoregular polymers or copolymers of α-olefins having at least 3 carbon atoms can be obtained in high yields, and that the catalyst is easy to prepare, and since the amounts of reagents used in catalyst preparation can be reduced, the amounts of by-products generated during catalyst preparation which are troublesome to dispose of can be markedly decreased.

In the preparation of a titanium catalyst component as in the above-cited Japanese Laid-Open Pat. No. 126590/75 in which a mechanically co-pulverized product of the halogen-containing magnesium compound and the organic acid ester is to be directly reacted with the titanium compound, a catalyst of high performance having a larger amount of titanium deposited can be obtained by suspending the co-pulverized product in an excess of the titanium compound maintained in the liquid state. According to such a process for supporting in the liquid phase, a greater part of the titanium compound is not deposited, but is recovered as contaminated with impurities. The titanium compound has to be regenerated before re-use, but since no exonomical regenerating method has been found, such a titanium compound must be discarded and therefore is likely to cause pollution. It has been found however that a solid reaction product obtained by pre-treating the above mechanically copulverized product with a small amount of an organometallic compound, and then reacting the resulting solid product with a markedly reduced amount of a titanium compound in the absence of mechanical pulverization can be titanium catalyst component which will show superior performance in the polymerization of α-olefins having at least 3 carbon atoms without involving the disadvantages or troubles mentioned above.

It is an object of this invention therefore to provide a process for polymerizing α-olefins having at least 3 carbon atoms which can afford highly stereoregular polymers or copolymers of the α-olefins in high yields.

Another object of this invention is to provide a process for preparing a titanium catalyst component easily without involving the trouble of disposing of the by-products, which is useful for preparing highly stereoregular α-olefin polymers having at least 3 carbon atoms; and also a catalyst for polymerizing α-olefins containing at least 3 carbon atoms which comprises the above titanium catalyst component.

Other objects and advantages of this invention will become more apparent from the following description.

According to the present invention, there is provided a catalyst composed of (A) a solid reaction product obtained by treating (i) a mechanically copulverized product of a halogen-containing mgnesium compound and an organic acid ester with (ii) an organometallic compound of a metal of Groups I to III of the periodic table, and then reacting the resulting product with (iii) a titanium compound in the absence of mechanical pulverization, and (B) an organometallic compound of a metal of Groups I to III of the periodic table.

The invention also provides a process for polymerizing α-olefins having at least 3 carbon atoms, for example, the polymerization or copolymerization of α-olefins having at least 3 carbon atoms, or the copolymerization of α-olefins having at least 3 carbon atoms with not more than 50 mole%, based on the total amount of the monomers, of ethylene, in the presence of the above catalyst.

The halogen-containing magnesium compound is desirably a solid which is as anhydrous as possible, but the inclusion of moisture in an amount which does not substantially affect the performance of the catalyst is permissible. For the convenience of use, it is used advantageously as a powder having an average particle diameter of about 1 to about 50 μ. Larger particles can be used because they can be pulverized by the mechanical copulverization treatment during the preparation of the catalyst component (A). The halogen-containing magnesium compound may be those containing other groups such as an alkoxy group, but magnesium dihalides give the best results. Examples of them are magnesium chloride, magnesium bromide, and magnesium iodide, the magnesium chloride being most preferred.

The mechanically copulverized product (i) can be prepared by pulverizing a halogen-containing magnesium compound and a free organic acid ester, or they may be converted into a complex before copulverization. Mechanical copulverization can be performed in the substantial absence of oxygen or water using, for example, a ball mill, vibratory mill, or impact mill. The pulverization time, although differing from apparatus to apparatus, is about 1 hour to 10 days, for example. The pulverization can be performed at room temperature, and it is not particularly necessary to heat or cool the pulverization system. Where there is a vigorous exotherm, cooling may be suitably carried out. The temperature is, for example, about 0° to about 100° C. Preferably, the pulverization is carried out until the halogen-containing magnesium compound attains a surface area of at least 3 m²/g, preferably at least 30 m²/g. Usually, the pulverization is carried out in one step, but may be carried out in a multiplicity of steps. For example, it is possible first to copulverize the halogen-containing magnesium compound and pulverization aids to be described hereinbelow, then add the organic acid ester, and continue the pulverization.

The mechanical copulverization can be performed in the presence of organic or inorganic pulverization aids. Examples of the pulverization aids include inert liquid diluents such as hexane, heptane, and kerosene; organic solid diluents such as polystyrene and polypropylene; and inert inorganic solids such as boron oxide and silicon oxide.

The pulverization aids can be used in an amount of about 1/100 to about 1 time the weight of the halogen-containing magnesium compound.

The amount of the organic acid ester used in the reaction of forming the mechanically pulverized product of the halogen-containing magnesium compound and the organic acid ester is about 0.01 to less than 1 mole, preferably about 0.1 to about 0.5 mole, per mole of the halogen-containing magnesium compound.

The organic ester used in forming the mechanically copulverized product is preferably selected from the group consisting of aliphatic carboxylic acid esters, halogenated aliphatic carboxylic acid esters, alicyclic carboxylic acid esters, and aromatic carboxylic acid esters. Preferred species are aliphatic carboxylic acid esters containing up to 18 carbon atoms, halogenated aliphatic carboxylic acid esters containing up to 18 carbon atoms, alicyclic carboxylic acid esters containing up to 12 carbon atoms, and aromatic carboxylic acid esters containing up to 20 carbon atoms.

Examples of such organic acid esters are esters formed between carboxylic acids or halocarboxylic acids selected from the group consisting of saturated or unsaturated aliphatic carboxylic acids containing 1 to 8 carbon atoms, especially 1 to 4 carbon atoms and their halogen-substitution products, and alcohols or phenols selected from the group consisting of saturated or unsaturated aliphatic primary alcohols containing 1 to 8 carbon atoms, especially 1 to 4 carbon atoms, saturated or unsaturated alicyclic alcohols containing 3 to 8 carbon atoms, especially 5 to 6 carbon atoms, phenols containing 6 to 10 carbon atoms, especially 6 to 8 carbon atoms, and alicyclic or aromatic primary alcohols having a $C_1$–$C_4$ aliphatic saturated or unsaturated primary alcohol moiety bonded to an acrylic or aromatic ring with 3 to 10 carbon atoms. Further examples include esters formed between alicyclic carboxylic acids containing 6 to 12 carbon atoms, especially 6 to 8 atoms, and saturated or unsaturated aliphatic primary alcohols containing 1 to 8, especially 1 to 4, carbon atoms. There can also be cited esters formed between aromatic carboxylic acids containing 7 to 12 carbon atoms, especially 7 to 10 carbon atoms, and alcohols or phenols selected from the group consisting of saturated or unsaturated aliphatic primary alcohols containing 1 to 8 carbon atoms, 1 to 4 carbon atoms, phenols containing 6 to 10 carbon atoms, especially 6 to 8 carbon atoms, and alicyclic or aromatic primary alcohols having a $C_1$–$C_4$ aliphatic saturated or unsaturated primary alcohol moiety bonded to an alicyclic or aromatic ring with 3 to 10 carbon atoms.

Specific examples of the aliphatic carboxylic esters are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate and allyl acetate; primary alkyl esters of unsaturated fatty acids such as methyl acrylate, methyl methacrylate, and n-butyl crotonate; and halogen-substitution products of these esters.

Specific examples of the alicyclic carboxylic acid esters include methyl cyclohexanecarboxylate, ethyl cyclohexanecarboxylate, methyl methylcyclohexanecarboxylate and ethyl methylcyclohexanecarboxylate.

Specific examples of the aromatic carboxylic acid esters include primary alkyl esters of benzoic acid such as methyl benzoate, ethyl benzoate, n-propyl benzoate, n- or i-butyl benzoate, n- and i-amyl benzoate, n-hexyl benzoate, n-octyl benzoate, and 2-ethylhexyl benzoate; primary alkyl esters of toluic acid such as methyl toluate, ethyl toluate, n- or i-butyl toluate, and 2-ethylhexyl toluate; primary alkyl esters of anisic acid such as methyl anisate, ethyl anisate, or n-propyl anisate; and primary alkyl esters of naphthoic acid such as methyl naphthoate, n-propyl naphthoate, n-butyl naphthoate, and 2-ethylhexyl naphthoate.

Of these compounds, the aromatic carboxylic acid esters are preferred. Alkyl esters with 1 to 4 carbon atoms, particularly methyl or ethyl esters, of benzoic acid, p-toluic acid or p-anisic acid are especially preferred.

The mechanically copulverized product (i) is treated with the organometallic compound of a metal of Groups I and III of the periodic table. In order to cause the reaction to proceed uniformly and rapidly, this treatment is preferably carried out in an inert solvent such as hexane, heptane or kerosene. The reaction can be performed in the absence of solvent, but the reaction may proceed heterogeneously or require unduly much time. Generally, an embodiment is employed in which the copulverized product is suspended in the inert solvent in a concentration of, say, about 10 to 1,000 g/liter, preferably about 50 to about 500 g/liter, and the organometallic compound is then added to the resulting suspension. The treating temperature is preferably about 0° to about 100° C. Since the reaction proceeds even at room temperature, temperatures of about 0° to about 50° are more frequently employed. The treating time is about 10 minutes to about 5 hours.

The amount of the organometallic compound used is preferably about 0.01 to about 10 moles, are preferably about 0.2 to about 2 moles, per mole of the organic ester in the copulverized product. During this treatment, the same organic acid ester as used in the preparation of the copulverized product may be present together.

The solid product so treated is preferably separated from the treating system, and then washed with a suitable inert solvent such as hexane, heptane, or kerosene. Desirably, washing is carried out until the amount of the organic acid ester in the solid product becomes at least about 0.5 millimole per gram of the solid product. For this purpose, the amount of the organometallic compound, the treating temperature and the treating time should be selected from the ranges already illustrated above.

Preferably, the organometallic compound of a metal of Groups I to III of the periodic table is selected from the group consisting of:

(1) organoaluminum compounds of the formula $$R_m^1 Al(OR^2)_n H_p X_q$$

wherein $R^1$ and $R^2$ are identical to, or different from, each other, and represents an alkyl group containing 1 to 8 carbon atoms, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula $$M^1 AlR_{4-s}^1 H_s$$

wherein $R^1$ is the same as defined hereinabove, $M^1$ represents lithium, sodium or potassium, and s is at least 0 but below 4 ($0 \leq s < 4$), (3) compounds of the formula $$R^1 R^3 M^2 \text{ps}$$

wherein $R^1$ is the same as defined hereinabove, $R^3$ is the same as $R^1$, or represents a halogen atom, and $M^2$ represents beryllium, magnesium, zinc or cadmium, and (4) compounds of the formula $$R^1 M^1$$

wherein $R^1$ and $M^1$ are the same as defined above.

Examples of the organoalumium compounds (1) above are as follows:

(a) p=q=0

$$R_m^1 Al(OR^2)_{3-m}$$

wherein $R^1$ and $R^2$ are the same as defined herein above, and m is preferably 1.5 to 3 ($1.5 \leq m \leq 3$).

(b) n=p=0

$$R_m^1 AlX_{3-m}$$

wherein $R^1$ is the same as defined hereinabove, X is a halogen atom, and m is $0 < m < 3$.

(c) n=q=0

$$R_m^1 AlH_{3-m}$$

wherein $R^1$ is the same as defined hereinabove, and m is preferably $2 \leq m \leq 3$.

(d) p=0

$$R_m^1 Al(OR^2)_n X_q$$

wherein $R^1$ and $R^2$ are the same as defined hereinabove, X is a halogen, $0 \leq m \leq 3$, $0 \leq n \leq 3$, $0 \leq q \leq 3$, and $m+n+q=3$.

Specific examples of the aluminum compound (1) include trialkyl aluminums such as triethyl aluminum or tributyl aluminum, and combinations of these, preferably triethyl aluminum and tributyl aluminum (p=q=o, and m=3); dialkyl aluminum alkoxides such as diethyl aluminum ethoxide and dibutyl aluminum butoxide, alkyl aluminum sesquialkoxides such as ethyl aluminum sesquiethoxide and butyl aluminum sesquibutoxide, and alkoxylated alkyl alminums having an average composition expressed, for example, by $R_{2.5}^1 Al(OR^2)_{0.5}$ (p=q=0, $1.5 \leq m < 3$); partially halogenated alkyl aluminums (n=p=0) such as dialkyl aluminum halogenides (m=2) such as diethyl aluminum chloride, dibutyl aluminum chloride and diethyl aluminum bromide, alkyl aluminum sesquihalogenides (m=1.5) such as ethyl aluminum sesquichloride, butyl aluminum sesquichloride, and ethyl aluminum sesquibromide, and alkyl aluminum dihalogenides (m=1) such as ethyl aluminum dichloride, propyl aluminum dichloride and butyl aluminum dibromide; partially hydrogenated alkyl aluminums (n=q=0) such as dialkyl aluminum hydrides (m=2) such as diethyl aluminum hydride and dibutyl aluminum hydride, and alkyl aluminum dihydrides (m=1) such as ethyl aluminum dihydride and propyl aluminum dihydride; and partially alkoxylated and halogenated alkyl aluminums (p=0) such as ethyl aluminum ethoxychloride, butyl aluminum butoxychloride and ethyl aluminum ethoxybromide (m=n=q=1).

Examples of the organometallic compounds (2) to (4) above include lithium aluminum tetraethyl (LiAl($C_2H_5$)$_4$), sodium aluminum tetrabutyl, potassium aluminum tetraethyl, diethyl beryllium, diethyl magnesium, diethyl zinc, diethyl calcium, ethyl magnesium chloride, and propyl lithium.

In the present invention, the solid reaction product obtained by treating (i) a mechanically co-pulverized product of a halogen-containing magnesium compound and an organic acid ester with (ii) an organometallic compound of a metal of Groups I to III of the periodic table, and then reacting the treated solid product with (iii) a titanium compound in the absence of mechanical pulverization is used as the titanium catalyst component.

The solid product treated with organometallic compound contains a small amount of a metal atom in some form ascribable to the organometallic compound, which metal cannot be removed by simple washing with an inert solvent. The treated solid product is reacted with the titanium compound in the absence of mechanical pulverization.

It is important and essential that in the preparation of the titanium catalyst component in accordance with this invention, the contacting of the halogen-containing magnesium compound with the organic acid ester should be effected under mechanical pulverization, and the reaction of the solid reaction product with the titanium compound should be carried out in the absence of mechanical pulverization. Interestingly, as will be shown in Comparative Example 1 to be given hereinbelow, a titanium catalyst component obtained by merely contacting the halogen-containing magnesium compound with the organic acid ester without mechanical copulverization to form a complex between the two compounds, treating the complex with the organometallic compound, and then reacting the treated product with the titanium compound under mechanical pulverization cannot achieve the improvement intended by the present invention in the polymerization of α-olefins with at least 3 carbon atoms.

The reaction of the solid product treated with the organometallic compound with the titanium compound can be performed by any desired means which can ensure intimate contact of the two components. Where the titanium compound is a liquid, the reaction can be carried out without particularly employing a solvent. Usually, the treated solid product can be contacted with the titanium compound by suspending it in a solution of the titanium compound in an inert solvent. The reaction temperature used at this time is, for example, about 0° to about 100° C., preferably about 10° to about 40° C., and the reaction time is, for example, about 10 minutes to about 5 hours. Hexane, heptane or kerosene can, for example, be used as such a solvent.

Examples of the titanium compound used in this reaction are expressed by the general formula

$Ti(OR)_rX_{4-r}$ wherein R represents a hydrocarbon group, X represents a halogen atom, and r is 0 to 4 ($0 \leq r \leq 4$). Titanium tetrachloride is especially preferred.

There is no particular restriction on the amount of the titanium compound used, but amounts of about 0.02 to 0.2 mole, preferably about 0.05 to 0.2 mole, per atom of magnesium suffice. After the reaction, the titanium catalyst component can be separated by washing the reaction product with an inert solvent.

The proportion of the titanium compound supported based on the titanium compound used is higher as the amount of the titanium compound used is smaller. For example, when about 0.02 to about 0.03 mole of the titanium compound is used per atom of magnesium, substantially all of the titanium compound is deposited, and supported. When about 0.2 mole of the titanium compound is used per atom of magnesium, about 50% of the titanium compound is supported.

The catalyst in accordance with this invention is a combination of the titanium catalyst component supported on the halogen-containing magnesium compound obtained by the method described hereinabove, and an organometallic compound. Examples of the organometallic compounds are organoaluminum compounds (1) exemplified hereinabove as the organometallic compounds of a metal of Groups I to III of the periodic table. Preferably, they are trialkyl aluminums, especially triethyl aluminum and tributyl aluminum.

In the preparation of the titanium catalyst component in accordance with the present invention, the amount of the titanium compound used is very small. The titanium catalyst component so obtained, when combined with the organometallic compound of a metal of Groups I to III of the periodic table, especially organoaluminum compounds, can catalyze homopolymerization, random copolymerizaton, and block copolymerization of olefins with high activity. The catalyst in accordance with this invention is characterized by the fact that even if the molar ratio between the organic acid ester and titanium in the titanium catalyst component is relatively high, the catalyst exhibits high activity. Especially when the catalyst of this invention is used to polymerize α-olefins with at least 3 carbon atoms such as propylene, 1-butene and 4-methylpentene-1, the resulting polymer has a high bulk density, and an amorphous polymer occurs in a reduced ratio.

The catalyst of this invention can catalyze the polymerization of α-olefins having at least 3 carbon atoms, for example, the polymerization or copolymerization of α-olefins having at least 3 carbon atoms, or the copolymerization of α-olefins having at least 3 carbon atoms and not more than 50 mole% of ethylene. The polymerization can be performed under known conventional conditions. For example, the polymerization can be carried out in the presence or absence of an inert solvent such as hexane, heptane or kerosene at a temperature of about 0° to about 300° C., preferably about 0° to about 200° C. and a pressure of 1 to about 70 kg/cm², preferably 1 to about 50 kg/cm². The liquefied monomers can be used also as a solvent. The polymerization can be carried out by using 0.0001 to 1 millimole, calculated as titanium atom, of the titanium catalyst component per liter of the inert solvent (or per liter of the space in the polymerization zone in the absence of the solvent), and the organometallic compound in an amount such that the molar ratio of the metal atom in the organometallic compound to the titanium atom is about 1:1 to 1000:1, preferably about 1:1 to about 100:1. During the polymerization, a molecular weight controlling agent such as hydrogen, and a stereoregularity controlling agent such as an aromatic carboxylic acid ester, such as benzoic acid, p-toluic acid or anisic acid esters, for example, $C_1$–$C_4$ alkyl esters, especially methyl or ethyl esters, may be used conjointly.

The following Examples and Comparative Examples further illustrate the invention.

EXAMPLE 1

Preparation of a titanium catalyst component:

Anhydrous magnesium chloride (20 g), 5.0 ml of ethyl benzoate and 3.0 ml of kerosene were charged under a nitrogen atmosphere into 800 ml. stainless steel (SUS 32) ball mill with an inside diameter of 100 mm which accomodated therein 100 stainless (SUS 32) balls with a diameter of 15 mm, and were contacted with one another for 120 hours at a rotating speed of 125 rpm under mechanical pulverization. The co-pulverized product obtained was suspended in 100 ml of kerosene, and 20 millimoles of triethyl aluminum was added. The mixture was stirred at room temperature for 1 hour. The solid portion was separated by filtration, and washed with 1 liter of hexane. The solid product so treated was suspended in 100 ml of kerosene containing 10 millimoles of titanium tetrachoride, and the mixture was stirred at room temperature for 1 hour. The solid portion was separated by filtration, and washed with 1 liter of hexane to afford a titanium catalyst component which contained 1.5% by weight of titanium, 57.0% by weight of chlorine, 16.0% by weight of ethyl benzoate, and 0.5% by weight of aluminum. calculated as atoms.

Polymerization:

A 2-liter autoclave was charged with 1 liter of refined kerosene, 1.0 millimole of triethyl aluminum and 0.1 millimole, calculated as titanium atom, of the titanium catalyst component obtained. The mixture was heated at 60° C., and then propylene was introduced. At a total pressure of 7.0 kg/cm$^2$, propylene was polymerized for 1 hour. After the polymerization, the solid matter was separated by filtration to afford 364 g of polypropylene as a white powder which had a boiling n-heptane extraction residue of 97% and an apparent density of 0.34 g/ml. Concentration of the liquid phase afforded 10.5 g of a solvent-soluble polymer.

The catalyst used in this Example had an average specific activity of polymerization of 535 PP-g/Ti-mmol.hr.atm.

EXAMPLES 2 to 8 AND COMPARATIVE EXAMPLES 1 AND 2

Titanium catalyst components were prepared by the procedure of Example 1 except that the amount of ethyl benzoate added to the ball mill, the amount of triethyl aluminum used for the treatment of the co-pulverized product, the temperature for the treatment, and the conditions for the reaction between the treated product and titanium tetrachloride were varied. Using each of the titanium catalyst components and triethyl aluminum, propylene was polymerized under the same conditions as in Example 1. The results are shown in Table 1.

Table 1 shows that according to the present invention, the amount of Ti discarded (the unreacted Ti compound) was small, and catalysts of high activity capable of giving highly stereoregular polymers of α-olefins (e.g., $C_3$) could be obtained. When proper conditions were selected, the amount of Ti discarded was almost zero (Examples 5 and 6). Even when the amount of titanium tetrachloride was increased in order to increase the amount of Ti to be deposited, the amount of Ti discarded was about 50% based on the amount of titanium tetrachloride used (Examples 7 and 8).

Table 1

| Example (Ex.) and Comparative Example (CE.) | Preparation of titanium catalyst component | | | | | | | | | |
|---|---|---|---|---|---|---|---|---|---|---|
| | MgCl$_2$ (g) | Ethyl benzoate | | Al(C$_2$H$_5$)$_3$ | | TiCl$_4$ | | | | Amount of Ti discarded (mmol) |
| | | Amount (ml) | Method of contact | Amount (mmol) | Contacting temperature (°C.) | Amount (mmol) | Contacting temperature (°C.) | Method of contacting | Ti content (wt. %) | Cl content (wt. %) | |
| Ex. 1 | 20 | 5.0 | Copulverization | 20 | Room temp. | 10 | Room temp. | in kerosene | 1.5 | 57.0 | 3 |
| Ex. 2 | " | 10.0 | Copulverization | 60 | Room temp. | " | Room temp. | in kerosene | 1.4 | 47.0 | 3 |
| Ex. 3 | " | 5.0 | Copulverization | 40 | Room temp. | " | Room temp. | in kerosene | 1.7 | 58.0 | 2 |
| Ex. 4 | " | " | Copulverization | 20 | 60 | " | Room temp. | in kerosene | 1.3 | 57.0 | 4 |
| Ex. 5 | " | " | Copulverization | " | Room temp. | 5 | Room temp. | in kerosene | 1.0 | 57.0 | almost 0 |
| Ex. 6 | " | " | Copulverization | " | Room temp. | 10 | 100 | in kerosene | 2.1 | 58.0 | almost 0 |
| Ex. 7 | " | " | Copulverization | " | Room temp. | 20 | Room temp. | in kerosene | 2.8 | 59.0 | 7 |
| Ex. 8 | " | " | Copulverization | " | 60 | 40 | Room temp. | in kerosene | 3.6 | 54.0 | 22 |
| CE. 1 | " | 7.5 | in kerosene | " | Room temp. | 10 | Room temp. | Co-pulverization | 2.0 | 56.0 | 0 |
| CE. 2 | " | " | in kerosene | " | Room temp. | " | Room temp. | in kerosene | 0.8 | 72.0 | 7 |

Table 1-continued

| Example (Ex.) and Comparative Example (CE.) | Powdery solid (g) | Soluble polymer (g) | Powder extraction residue (g) | Apparent density (g/ml) | Average specific activity of polymerization PP-g/TT-mmol.hr.atm.) |
|---|---|---|---|---|---|
| Ex. 1 | 364 | 10.5 | 97 | 0.34 | 535 |
| Ex. 2 | 257 | 4.1 | 98 | 0.28 | 373 |
| Ex. 3 | 312 | 5.1 | 95 | 0.33 | 453 |
| Ex. 4 | 374 | 9.6 | 98 | 0.30 | 548 |
| Ex. 5 | 300 | 5.9 | 97 | 0.32 | 437 |
| Ex. 6 | 317 | 5.0 | 93 | 0.29 | 460 |
| Ex. 7 | 298 | 4.4 | 93 | 0.30 | 432 |
| Ex. 8 | 283 | 4.0 | 94 | 0.33 | 410 |
| CE. 1 | 73.6 | 8.0 | 84 | 0.21 | 117 |
| CE. 2 | 90.2 | 8.2 | 82 | 0.19 | 141 |

COMPARATIVE EXAMPLE 3

Preparation of a titanium catalyst component:

Instead of preparing a copulverized product of magnesium and ethyl benzoate as in Example 1, 20 g of magnesium chloride and 7.5 ml of ethyl benzoate were reacted in 100 ml of kerosene at 130° C. for 2 hours. The resulting complex was treated with triethyl aluminum in the same way as in Example 1. The product was then washed with hexane. The resulting solid product and 10 millimoles of titanium tetrachloride were pulverized under an atmosphere of nitrogen at a rotating speed of 125 rpm for 120 hours in a 800 ml stainless steel (SUS 32) ball mill with an inside diameter of 100 mm which accomodated therein 100 stainless steel (SUS 32) balls, with a diameter of 15 mm. A titanium catalyst component which contained 2.0% by weight of titanium and 56.0% by weight of chlorine, calculated as atoms.

Polymerization:

Propylene was polymerized under the same conditions as in Example 1 to afford 73.6 g of polypropylene as a white powder which had a boiling n-heptane extraction residue of 84% and an apparent density of 0.21 g/ml. Concentration of the liquid phase afforded 8.0 g of a solvent-soluble polymer.

g of magnesium chloride and 7.5 ml of ethyl benzoate were reacted at 130° C. for 2 hours in 100 ml of kerosene. Otherwise, the same procedure as in Example 1 was repeated to form a titanium catalyst component which contained 0.8% by weight of titanium and 72.0% by weight of chlorine calculated as atoms.

Polymerization:

Propylene was polymerized under the same conditions as in Example 1 using the titanium catalyst component so prepared. Polypropylene was obtained as a white powder in an amount of 90.2 g. The polymer had a boiling n-heptane extraction residue of 82%, and an apparent density of 0.19 g/ml. Concentration of the liquid phase afforded 8.2 g of a solvent-soluble polymer.

The catalyst used in this example had an average specific activity of polymerization of 141 PP-g/Ti-mmol. hr.atm.

EXAMPLES 9 to 13

Titanium catalyst components were prepared in the same way as in Example 1 except that the kind of the organic ester added at the time of ball milling was varied. Using each of the titanium catalyst components obtained, propylene was polymerized in the same way as in Example 1. The results are shown in Table 2.

Table 2

| | Preparation of titanium catalyst component | | | | | Results of polymerization | | | | |
|---|---|---|---|---|---|---|---|---|---|---|
| Example | Organic acid ester | Amount (ml) | Ti content (wt. %) | Cl content (wt. %) | Organic acid ester content (wt. %) | Al content (wt. %) | Powdery solid (g) | Soluble polymer (g) | Extraction residue of powder | Apparent density (g/ml) | Average specific activity of polymerization (PP-g/Ti-mmol. hr. atm.) |
| Ex. 9 | Methyl benzoate | 5.0 | 1.4 | 56.3 | 14.3 | 0.4 | 351 | 11.3 | 96 | 0.35 | 518 |
| Ex. 10 | Methyl p-toluate | " | 1.5 | 57.5 | 15.2 | 0.6 | 378 | 9.7 | 96 | 0.33 | 554 |
| Ex. 11 | Ethyl p-toluate | " | 1.6 | 59.0 | 16.9 | 0.5 | 398 | 12.0 | 94 | 0.31 | 586 |
| Ex. 12 | Methyl p-anisate | " | 1.4 | 56.8 | 17.0 | 0.4 | 327 | 8.8 | 94 | 0.30 | 480 |
| Ex. 13 | Ethyl p-anisate | " | 1.4 | 57.4 | 19.1 | 0.5 | 402 | 13.1 | 95 | 0.32 | 593 |

The catalyst used in this example had an average specific activity of polymerization of 117 PP-g/Ti-mmol.hr.atm.

COMPARATIVE EXAMPLE 4

Preparation of a titanium catalyst component:

Instead of preparing a copulverized product of magnesium chloride and ethyl benzoate as in Example 1, 20

EXAMPLE 14

Preparation of a titanium catalyst component:

A titanium catalyst component was prepared in the same way as in Example 1 except that 20 millimoles of diethyl aluminum monochloride was used instead of 20 millimoles of triethyl aluminum. The resulting catalyst component contained 1.2% by weight of titanium, 59.7% by weight of chlorine, 14.0% by weight of ethyl benzoate, and 0.6% by weight of aluminum, calculated as atoms.

Polymerization:

Using the resulting titanium catalyst component, propylene was polymerized under the same conditions as in Example 1 to afford 343 g of polypropylene as a white powder having a boiling n-heptane extraction residue of 98% and an apparent density of 0.35 g/ml. Concentration of the liquid phase afforded 12.7 g of a solvent-soluble polymer. The catalyst used in this example had an average specific activity of polymerization of 508 PP-g/Ti-mmol.hr.atm.

EXAMPLE 15

Preparation of a titanium catalyst component:

A titanium catalyst component was prepared in the same way as in Example 1 except that the copulverized product was treated with triethyl aluminum in the presence of 10 millimoles of ethyl benzoate at room temperature for 1 hour. The resulting catalyst component contained 1.6% by weight of titanium, 54.0% by weight of chlorine, 18.5% by weight of ethyl benzoate and 0.6% by weight of aluminum.

Polymerization:

A 2-liter autoclave was charged with 1 liter of refined kerosene, and then at 40° C. in an atmosphere of propylene, with 5.0 millimoles of triisobutyl aluminum and 1.59 millimoles of methyl p-toluate. Five minutes later, 0.03 millimole, calculated as the titanium atom, of the titanium catalyst component was added. The mixture was heated to 60° C., and the total pressure was raised to 8.0 kg/cm². Subsequently, 250 ml of hydrogen was introduced, and the propylene was polymerized for 5 hours. After the polymerization, the solid matter was separated by filtration to afford 195 g of polypropylene as a white powder having a boiling n-heptane extraction residue of 98% and an apparent density of 0.40 g/ml. Concentration of the liquid phase afforded 6.6 g of a solvent-soluble polymer.

The catalyst used in this example had an average specific activity of polymerization of 168 PP-g/Ti-mmol.hr.atm.

What we claim is:

1. A process for polymerizing or copolymerizing α-olefins having at least 3 carbon atoms or copolymerizing α-olefins having at least 3 carbon atoms with not more than 50 mol% of ethylene in the presence of a catalyst composed of (B) an organoaluminum compound of the formula $$R_m{}^1Al(OR^2)_nH_pX_q$$

wherein $R^1$ and $R^2$ are identical to, or different from, each other and represent an alkyl group containing 1 to 8 carbon atoms, X represents a halogen atom, m is more than 0 but not more than 3 ($0<m\leq 3$), n is at least 0 but less than 3 ($0\leq n<3$), p is at least 0 but less than 3 ($0\leq p<3$), q is at least 0 but less than 3 ($0\leq q<3$), and m+n+p+q=3, and (A) a titanium catalyst component supported on a halogen-containing magnesium compound selected from the group consisting of a magnesium dihalide and a halogen-containing magnesium compound having an alkoxy group, said titanium catalyst component consisting essentially of a solid reaction product obtained by treating under non-mechanical pulverization conditions at a temperature of about 0 to about 100° C. (i) a mechanically copulverized product of said halogen-containing magnesium compound and from about 0.01 to less than 1 mol, per mol of the halogen-containing magnesium compound, of an organic acid ester selected from the group consisting of aliphatic carboxylic acid esters containing up to 18 carbon atoms, halogenated aliphatic carboxylic acid esters containing up to 18 carbon atoms, alicyclic carboxylic acid esters containing up to 12 carbon atoms and aromatic carboxylic acid esters containing up to 20 carbon atoms with (ii) an organo-aluminum compound having the formula $$R_m{}^1Al(OR^2)_nH_pX_q$$

where $R^1$, $R^2$, m, n, p, q and X are as defined above and then reacting the resulting solid product with (iii) a titanium compound of the formula $$Ti(OR)_rX_{4-r}$$

wherein R represents a hydrocarbon group, X represents a halogen atom, and r is a number of 0 to 4 ($0\leq r\leq 4$) in the absence of mechanical pulverization wherein the molar ratio of the metal atom in the organometallic compound (B) to the titanium atom in the titanium compound (iii) is about 1:1 to about 1000:1.

2. The process of claim 1 wherein the halogen-containing magnesium compound is a magnesium dihalide selected from the group consisting of magnesium chloride, magnesium bromide and magnesium iodide.

3. The process of claim 1 wherein the amount of the titanium catalyst component is 0.0001 to 1 millimole calculated as titanium atom per liter of an inert solvent.

4. The process according to claim 1 wherein the amount of the organic acid ester is about 0.1 to 0.5 mol, per mol of the halogen-containing magnesium compound.

5. The process according to claim 1 wherein the amount of the organometallic compound (ii) is about 0.01 to about 10 mols, per mol of the organic acid ester in the mechanically copulverized product.

6. The process according to claim 1 wherein the titanium compound (iii) is used in an amount of about 0.02 to 0.2 mol, per atom of magnesium.

7. The process of claim 1 in which the mechanically copulverized product of a halogen-containing magnesium compound and an organic acid ester (i) is treated with an organoaluminum compound (ii) under non-mechanical pulverization conditions and in an inert solvent.

8. A catalyst for polymerization or copolymerization of α-olefins having at least 3 carbon atoms and copolymerization of α-olefins having at least 3 carbon atoms and not more than 50mol% of ethylene, said catalyst being composed of (A) a titanium catalyst component which consists essentially of a solid reaction product obtained by treating under non-mechanical pulverization conditions at a temperature of about 0 to about 100° C. (i) a mechanically copulverized product of a halogen-containing magnesium dihalide and a halogen-containing magnesium compound having an alkoxy group, and from about 0.01 to less than 1 mol, per mol of the halogen-containing magnesium compound, of an organic acid ester selected from the group consisting of aliphatic carboxylic acid esters containing up to 18 carbon atoms, halogenated aliphatic carboxylic acid esters containing up to 18 carbon atoms, alicyclic carboxylic acid esters containing up to 12 carbon atoms and aromatic carboxylic acid esters containing up to 20 carbon atoms with (ii) an organoaluminum compound of the formula $$R_m^1Al(OR^2)_nH_pX_q$$

wherein $R^1$ and $R^2$ are identical to, or different from, each other and represent an alkyl group containing 1 to 8 carbon atoms, X represents a halogen atom, m is more than 0 but not more than 3 ($0 \leq m < 3$), n is at least 0 but less than 3 ($0 \leq n < 3$), p is at least 0 but less than 3 ($0 \leq p < 3$), q is at least 0 but less than 3 ($0 \leq q < 3$), and $m+n+p+q=3$, and then reacting the resulting solid product with (iii) a titanium compound of the formula $$Ti(OR)_rX_{4-r}$$

wherein R represents a hydrocarbon group, X represents a halogen atom, and r is a number of 0 to 4 ($0 \leq r \leq 4$) in the absence of mechanical pulverization, and (B) an organoaluminum compound of the formula $$R_m^1Al(OR^2)_nH_pX_q$$

wherein $R^1$ and $R^2$ are identical to, or different from, each other, and represent an alkyl group containing 1 to 8 carbon atoms, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), q is at least 0 but less than 3 ($0 \leq q < 3$), and $m+n+p+q=3$ wherein the molar ratio of the metal atom in the organometallic compound (B) to the titanium atom in the titanium compound (iii) is about 1:1 to about 1000:1.

9. The catalyst of claim 8 wherein the halogen-containing magnesium compound is a magnesium dihalide selected from the group consisting of magnesium chloride, magnesium bromide and magnesium iodide.

10. The catalyst according to claim 8 wherein the amount of the organic acid ester is about 0.1 to 0.5 mol, per mol of the halogen-containing magnesium compound.

11. The catalyst according to claim 8 wherein the amount of the organometallic compound (ii) is about 0.01 to about 10 mols, per mol of the organic acid ester in the mechanically copulverized product.

12. The catalyst according to claim 8 wherein the titanium compound (iii) is used in an amount of about 0.02 to 0.2 mol, per atom of magnesium.

13. The composition of claim 8 in which the mechanically copulverized product of a halogen-containing magnesium compound and an organic acid ester (i) is treated with an organoaluminum compound (ii) under non-mechanical pulverization conditions and in an inert solvent.

* * * * *